United States Patent [19]

Eggleston

[11] 4,196,032

[45] Apr. 1, 1980

[54] SPLICE FOR OPTICAL RIBBON HAVING ELONGATED STRAIN RELIEF ELEMENTS IN THE RIBBON AND METHOD OF SPLICING THE SAME

[75] Inventor: Frederick C. Eggleston, Decatur, Ill.

[73] Assignee: Essex Group, Inc., Fort Wayne, Ind.

[21] Appl. No.: 889,090

[22] Filed: Mar. 22, 1978

[51] Int. Cl.² .................. B32B 17/04; C03C 25/00; C03C 27/10; G02B 5/14
[52] U.S. Cl. .................................. 156/158; 29/464; 29/869; 65/4 A; 65/4 R; 156/166; 156/296; 156/304; 156/502; 264/1; 350/96.20; 350/96.21; 350/96.23; 428/57
[58] Field of Search ............... 29/464, 629; 65/4 A, 65/4 R, DIG. 7; 156/158, 166, 296, 304, 502; 264/1; 350/96.20, 96.21, 96.23; 428/57

[56] References Cited

U.S. PATENT DOCUMENTS

| | | | |
|---|---|---|---|
| 3,798,099 | 3/1974 | Marcatili | 350/96.23 X |
| 3,912,574 | 10/1975 | Cherin et al. | 156/502 |
| 3,920,432 | 11/1975 | Smith | 350/96.21 X |
| 3,928,102 | 12/1975 | Rowe et al. | 156/158 |
| 3,989,567 | 11/1976 | Tardy | 156/158 |
| 4,028,162 | 6/1977 | Cherin et al. | 156/158 |
| 4,029,390 | 6/1977 | Chinnock et al. | 156/158 X |
| 4,046,454 | 9/1977 | Pugh | 350/96 C |
| 4,047,796 | 9/1977 | Kao et al. | 350/96 C |
| 4,056,305 | 11/1977 | McCartney et al. | 350/96.21 |
| 4,061,416 | 12/1977 | Stewart | 350/96 C |
| 4,062,624 | 12/1977 | Hammer | 350/96 C |
| 4,088,386 | 5/1978 | Hawk | 350/96.21 |
| 4,123,137 | 10/1978 | Marcatili | 350/96.21 |
| 4,146,301 | 3/1979 | Cherin et al. | 350/96.21 |
| 4,149,072 | 4/1979 | Smith et al. | 350/96.21 X |

*Primary Examiner*—William A. Powell
*Assistant Examiner*—Robert A. Dawson
*Attorney, Agent, or Firm*—Lawrence E. Freiburger; Robert D. Sommer

[57] ABSTRACT

A splice for an optical ribbon utilizes the elongated strain relief members in the ribbon as guide members to form a space in which the optical channels of the two ribbons are axially aligned to optically connect them. The splice and corresponding splicing method are particularly useful to gang splice two optical ribbons.

6 Claims, 12 Drawing Figures

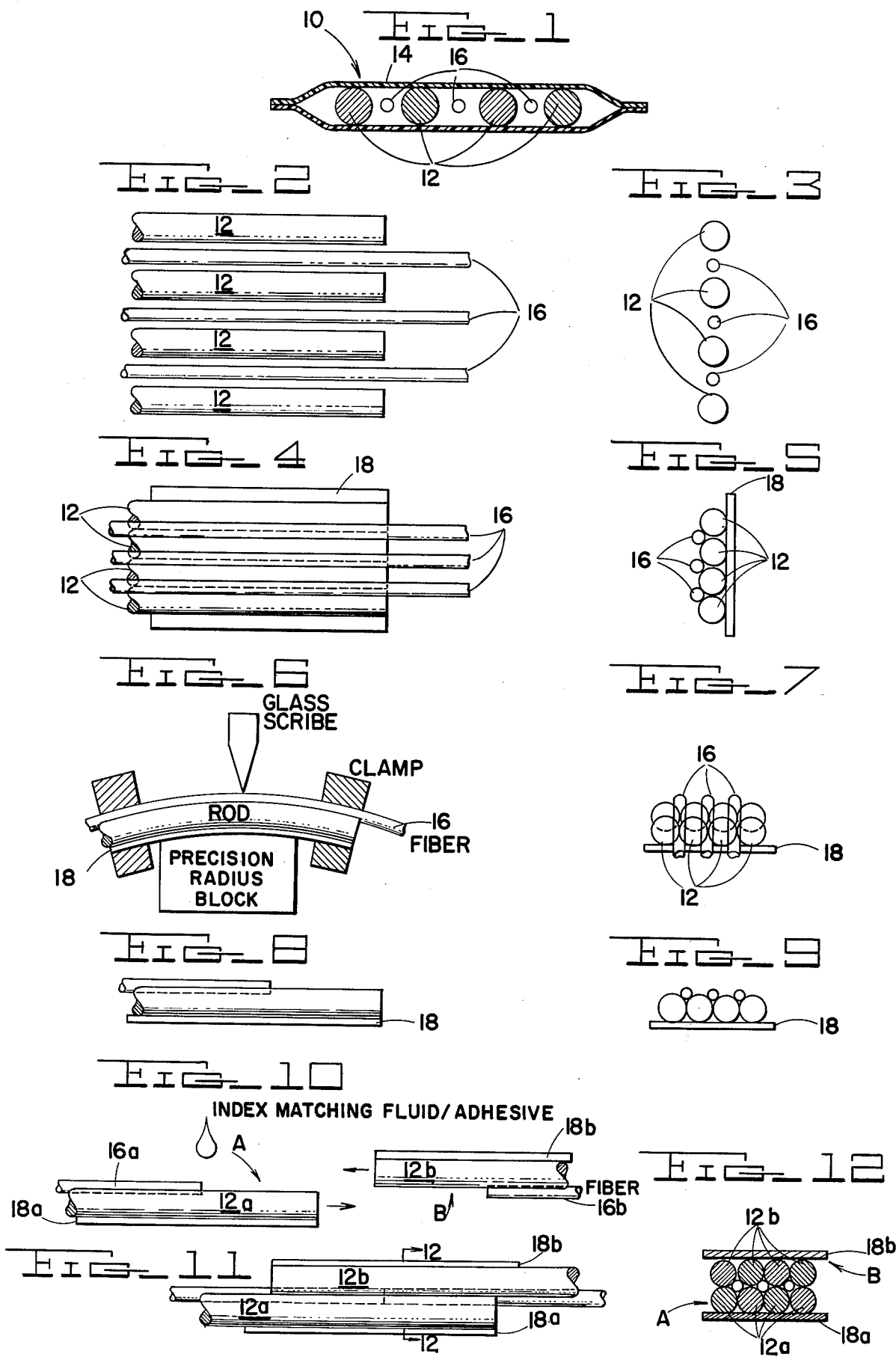

SPLICE FOR OPTICAL RIBBON HAVING ELONGATED STRAIN RELIEF ELEMENTS IN THE RIBBON AND METHOD OF SPLICING THE SAME

BACKGROUND OF THE INVENTION

Many techniques and apparatus have been developed to splice optical ribbons. As used herein, the term optical ribbon denotes a substantially planar array of a plurality of parallel elongated optical channels. The term optical channel is used to denote optical fibers and bundles.

In general, the prior art optical ribbon splicing techniques have employed a housing which serves to guide the optical channels of the two mating ribbons into axial alignment. Precision grooves have been used to guide the mating optical channels into alignment with one another as is shown by U.S. Pat. Nos. 3,912,574; 4,028,162; 4,029,390 and 4,046,454.

It has also been known to guide the optical channels of the two ribbons into axial alignment by using precision bores in a housing.

Another technique developed for connecting individual optical channels is to utilize three cylindrical parallel rods situated with their circumferential surfaces in contact to form an interstice which serves to guide the mating optical channels into axial contact with one another. Typical patents disclosing this type of connector arrangement are U.S. Pat. Nos. 3,989,567; 4,047,796; 4,056,305 and 4,061,416. Although this technique is satisfactory for connecting individual optical channels, it is not particularly adaptable to be used in connecting a pair of optical ribbons because of the rather large housing which is necessary. In addition, this technique is not particularly adaptable for gang splicing of optical ribbons. Another patent utilizing a similar technique is U.S. Pat. No. 4,062,624 which uses six flexible rods spaced circumferentially around the optical channels to be connected to guide the two channels into alignment.

SUMMARY OF THE INVENTION

In accordance with the present invention, elongated strain relief members in the ribbon are used as guide elements in splicing the two ribbons together. More specifically, the present invention can be utilized with optical ribbons having a single optical channel between two strain relief elements. The splice of the invention uses means for bringing the strain relief members of each ribbon into abutting side-by-side contact with one another to form a plurality of channels or grooves which each serve to locate one of the optical channels. The optical channels of each ribbon are severed short of the ends of the strain relief members of their ribbon, so that when the two prepared half splices are brought into engagement with the optical channel of the two ribbons axially aligned, the elongated strain relief members of the two ribbons overlap. Thus, two strain relief members of the one ribbon and the corresponding two strength members of the other ribbon, when brought into contact with one another, form a guiding groove for the optical channels of the two optical ribbons.

BRIEF DESCRIPTION OF THE DRAWINGS

FIG. 1 is a cross sectional view of an optical ribbon of the type which is spliced in accordance with the present invention;

FIGS. 2 and 3 are diagrammatic views of the strength elements and optical channels as they appear in the ribbon structure;

FIGS. 4 and 5 are diagrammatic views showing the arrangement of the strength elements and optical channels as they appear at the splice fixture;

FIGS. 6 and 7 are diagrammatic views showing the arrangement of the strength members and optical channels as they appear at a mass cleaving station;

FIGS. 8 and 9 are diagrammatic views showing a prepared splice half;

FIG. 10 is a diagrammatic view showing the arrangement of the two splice halves as they are brought into engagement with one another;

FIG. 11 is a diagrammatic view of the finished splice; and

FIG. 12 is a cross sectional view taken along lines 12—12 of FIG. 11.

DESCRIPTION OF THE PREFERRED EMBODIMENT OF THE INVENTION

Referring now to FIG. 1, a typical optical ribbon is disclosed which can be spliced in accordance with the present invention. For a more detailed description of the optical ribbon of FIG. 1 and other optical ribbons which can be spliced by using the present invention, reference may be made to applicant's copending patent application Ser. No. 877,047 filed Feb. 12, 1978 entitled FIBER OPTIC RIBBON AND CABLE MADE THEREFROM. It can be simply stated, however, that the splice of the invention can be used with optical ribbons in which a single optical channel is situated between two elongated strain relief members.

More specifically, the optical ribbon 10 of FIG. 1 includes a plurality of cylindrical elongated strain relief members 12 and a sheath 14 surrounding them. As shown in the drawing the sheath 14 is formed from upper and lower tapes which are bonded to one another at their longitudinal edges. The sheath 14 is not used in the splice of the invention and, accordingly, its structure is unrelated to the invention. Between each two adjacent strain relief elements 12 is a optical channel 16 which is preferably decoupled to the strain relief elements in accordance with applicant's above-noted copending patent application. However, since the only structures in the optical ribbon which are utilized in the splice of the invention are the strength members and the optical channels, it is noted that the present splicing invention can be used with optical ribbons in which the optical channel is coupled to the strain relief elements.

Referring now to FIGS. 2 and 3 the optical ribbon of FIG. 1 is prepared for splicing by removing the end portion of the sheath so that the strain relief elements 12 and optical channels 16 are exposed. If the optical ribbon is the type in which there is an encapsulant surrounding the strain relief elements and optical channels (a coupled structure) it is necessary to remove the encapsulant from the end also. After the end of each ribbon is prepared as noted in connection with FIGS. 2 and 3, the elongated strain relief members 12 are brought into lateral abutting contact with one another and each optical channel is located in a groove formed between the two adjacent strain relief members as shown in FIGS. 4 and 5. This can be accomplished by bonding the strain relief elements to a suitable planar substrate 18, which is cross hatched in the drawing as being metal, but may be constructed of other materials if desired. After the ribbon has been prepared as shown in FIGS. 4 and 5, it is subjected to a mass cleaving operation to cut the optical channels 16 shorter than the elongated strain relief members 12. If the optical channels are single glass optical fibers, this mass cleaving operation can be carried out as illustrated in FIGS. 6 and 7 by clamping the prepared ribbon end around a precision radius block 20 and scribing across the optical fibers at right angles to their axes. The result is a half splice which is hermaphroditic in nature and is used to connect to another similar half splice. The prepared half splice is illustrated in FIGS. 8 and 9. If the optical channels are other than single glass fibers, other techniques may be employed to perform the mass cleaving operation.

In order to complete the splice, the two prepared splice halves indicated by letters A and B in FIG. 10 are brought into engagement with one another by orienting the two halves so that the optical channels 16a and 16b of the two splice halves are aligned axially and the strain relief members 12a and 12b of the two splice halves overlap one another. A small amount of index matching fluid/adhesive may be applied to each junction of the optical channels to ensure that they are optically and mechanically connected to one another.

The finished splice is illustrated in FIGS. 11 and 12 where it will be seen that the overlapping strain relief members 12a and 12b are arranged so that the axes of corresponding strain relief members on splice halves A and B define a plane which is substantially perpendicular to the plane defined by the axes of the strain relief members in either splice half. Accordingly, it will be seen that two adjacent strength members in splice half A and a corresponding two adjacent strength members in splice half B cooperate to form an interstice in which the optical channels are located. The splice halves may be held together by adhesive or mechanical means co-operating with the two substrates 18.

From the above-noted description, it will be apparent to those skilled in the art that the relative diameters of the optical channels and the strain relief members must be determined so that the interstice formed between adjacent strain relief members is not too large or too small for the optical channel. It will also be clear to those skilled in the art that the splice and method disclosed herein is easily gang spliced and is relatively less bulky than prior art splices.

A preferred form of the invention has been illustrated above. Obvious modifications will occur to those skilled in the art. Accordingly, it is intended that the above description be used for exemplary purposes only and that the invention be defined in the claims.

What is claimed is:

1. A method of gang splicing a pair of continuous, indefinite length, optical ribbons each having at least one optical channel located in a substantially coplanar relationship between two elongated strain relief members, comprising the steps of:

holding said strain relief members of each ribbon in abutting lateral contact near the end of said optical ribbons;

preparing the adjoining ends of each said optical ribbon so that said strain relief members extend beyond the end of said optical channels; and bringing the adjoining ends of said optical ribbons together so that corresponding optical channels on the two optical ribbons are axially abutting one another and the adjacent strain relief members on one of said optical ribbons are in overlapping abutting contact with corresponding adjacent strain relief members on the other optical ribbon to form an interstice in which said corresponding optical channels are located.

2. The method as claimed in claim 1, wherein said holding step is accomplished by bonding said strain relief members to a substrate.

3. The method as claimed in claim 1 wherein the end of each ribbon is prepared in an identical manner.

4. A splice connection for optically connecting the optical channels in a pair of continuous, indefinite length optical ribbons of the type having alternating co-planar, optical channels and round strain relief members of larger diameter than the optical channels, comprising:

means at the end of each ribbon for positioning and holding the end portion of said strain relief members in abutting lateral contact with one another to form a longitudinal groove between abutting strain relief members, said strain relief members extending beyond the ends of said optical channels and the end of each optical channel being situated in the groove formed by two abutting strain relief members, said means for positioning and holding being adapted to become an integral part of said splice connection; and means for uniting the ends of said optical ribbons so that the optical channels of said ribbons are in abutting axial contact with one another, and the ends of the strain relief members of the ribbons are in overlapping contact with one another so that the end portions of adjoining optical channels are located in the interstice formed by two abutting strain relief members of one ribbon and the corresponding two abutting strain relief members of the other ribbon.

5. The splice connection as claimed in claim 4 wherein the means at the end of each ribbon for positioning and holding the end portion of said strain relief members in abutting lateral contact with one another comprises a substrate to which said end portions are bonded.

6. The splice connection as claimed in claims 4 or 5, wherein said means for uniting the ends of said optical ribbons comprises an adhesive for bonding said ends together.

* * * * *